(12) United States Patent
Dawkins et al.

(10) Patent No.: US 8,802,789 B2
(45) Date of Patent: Aug. 12, 2014

(54) POLYBENZIMIDAZOLE-POLYETHERKETONEKETONE BLENDS AND MISCIBLE BLENDS

(71) Applicants: Bobby G. Dawkins, Charlotte, NC (US); Michael Gruender, Charlotte, NC (US); Gregory S. Copeland, Tega Cay, SC (US); Tim Hsu, State College, PA (US)

(72) Inventors: Bobby G. Dawkins, Charlotte, NC (US); Michael Gruender, Charlotte, NC (US); Gregory S. Copeland, Tega Cay, SC (US); Tim Hsu, State College, PA (US)

(73) Assignee: PBI Performance Products, Inc., Charlotte, NC (US)

( * ) Notice: Subject to any disclaimer, the term of this patent is extended or adjusted under 35 U.S.C. 154(b) by 0 days.

(21) Appl. No.: 13/647,431

(22) Filed: Oct. 9, 2012

(65) Prior Publication Data

US 2013/0035454 A1 Feb. 7, 2013

Related U.S. Application Data

(62) Division of application No. 12/841,277, filed on Jul. 22, 2010, now Pat. No. 8,309,662, which is a division of application No. 11/671,159, filed on Feb. 5, 2007, now Pat. No. 7,915,351.

(51) Int. Cl.
*C08L 65/00* (2006.01)
*C08L 79/00* (2006.01)
*C08L 79/04* (2006.01)

(52) U.S. Cl.
USPC ........... 525/417; 525/420; 525/435; 525/471; 525/534

(58) Field of Classification Search
USPC .......................... 525/417, 420, 435, 471, 534
See application file for complete search history.

(56) References Cited

U.S. PATENT DOCUMENTS

| | | |
|---|---|---|
| 3,174,947 A | 3/1965 | Marvel et al. |
| RE26,065 E | 7/1966 | Marvel et al. |
| 3,433,772 A | 3/1969 | Chenevey et al. |
| 3,441,538 A | 4/1969 | Marks |
| 3,509,108 A | 4/1970 | Prince |
| 3,516,966 A | 6/1970 | Berr |
| 3,551,389 A | 12/1970 | Prince |
| 3,655,632 A | 4/1972 | Ohfuji et al. |
| 4,320,224 A | 3/1982 | Rose et al. |
| 4,861,537 A | 8/1989 | Ward et al. |
| 4,912,176 A | 3/1990 | Alvarez et al. |
| 4,973,630 A | 11/1990 | Leung et al. |
| 5,070,153 A | 12/1991 | Alvarez et al. |
| 5,139,863 A | 8/1992 | Alvarez et al. |
| 5,391,605 A | 2/1995 | Andres et al. |
| 5,844,036 A | 12/1998 | Hughes |
| 6,248,469 B1 | 6/2001 | Formato et al. |
| 6,946,211 B1 | 9/2005 | Bjerrum et al. |

OTHER PUBLICATIONS

Bryan B. Sauer et al., "Miscibility and phase properties of poly(aryl ether ketone)s with three high tempoerature all-aromatic thermoplastic polyimides," Polymer, Elsevier Science Ltd (Great Britain), (vol. 37), (Issue. 3), (p. 445-453), 1996.

*Primary Examiner* — Ana Woodward
(74) *Attorney, Agent, or Firm* — Hammer & Associates, P.C.

(57) ABSTRACT

A process for producing a solution blend of a polybenzimidazole (PBI) and a polyetherketoneketone (PEKK). The PBI is mixed with sulfuric acid at a temperature between 40° C. and 80° C. for 30 minutes to 2 hours to produce a PBI solution then cooled to room temperature to form a cooled PBI solution. Then PEKK is added to the cooled PBI solution to form a mixture and that mixture is stirred from 30 minutes to 2 hours at room temperature to form a stirred mixture. The stirred mixture is poured into an excess of water being stirred swiftly to form an aqueous mixture. The aqueous mixture is filtered to produce a blend. The blend is washed with water and dried. The resulting blend can yield a blend in all proportion from 1/99 PBI/PEKK to 99/1 PBI/PEKK.

2 Claims, 7 Drawing Sheets

POLYBENZIMIDAZOLE-POLY-ETHERKETONEKETONE BLENDS AND MISCIBLE BLENDS

RELATED APPLICATIONS

This is a divisional application of application Ser. No. 11/671,169 filed Feb. 5, 2007, now U.S. Pat. No. 7,915,351 and application Ser. No. 12/841,277 filed Jul. 22, 2010, now U.S. Pat. No. 8,309,662.

BACKGROUND OF THE INVENTION

The present invention provides a process to produce a solution blend of a polybenzimidazole (PBI) and a polyetherketoneketone (PEKK) where the process produces a blend in all proportions from 1/99 to 99/1 (PBI/PEKK).

Polybenzimidazoles (PBI) are polymers of high thermal stability and are resistant to oxidative or hydrolytic degradation. Polybenzimidazole polymers may be prepared by melt polymerizing an aromatic tetraamine and a diphenylester or an anhydride of an aromatic or heterocyclic dicarboxylic acid in a one or two-stage process; see, for example U.S. Pat. Nos. Re. 26,065; 3,174,947; 3,509,108; 3,551,389; 3,433,772; and 3,655,632. In particular, U.S. Pat. No. 3,551,389 discloses a two-stage process for the production of aromatic polybenzimidazoles, in which the monomers are heated at a temperature above 170° C. in a first-stage melt polymerization zone until a foamed prepolymer is formed. The foamed prepolymer is cooled, pulverized, and introduced into a second stage polymerization zone where it is heated again to yield a polybenzimidazole polymer product. Polybenzimidazoles also may be prepared from the free dicarboxylic acids or the methyl esters of such acids.

Polyaryletherketone polymers comprise a number of closely related polymers including polyetherketone (PEK), polyetheretherketone (PEEK), polyetheretherketoneketone (PEEKK), polyetherketonetherketoneketone (PEKEKK) and polyetherketoneketone (PEKK). These polymers are moldable, and thus easily formed into usable parts. They exhibit excellent long term oxidative stabilities at elevated temperatures (see U.S. Pat. No. 4,320,224 issued Mar. 16, 1982 for "Thermoplastic Aromatic Polyetherketones"). Of the polyaryletherketones, polyetheretherketone (PEEK) is widely commercially available and has been found to be an excellent thermoplastic molding resin. At ambient temperatures PEEK exists as a solid with crystalline and amorphous phases. The amorphous phase, which comprises 52 to 70% of the polymer softens at of temperatures about 143° C. to 155° C., corresponding to the glass transition temperature, Tg, of the amorphous phase.

The remaining 48 to 30% of the polymer exists as a crystalline phase with a melting temperature, Tm, of about 335° C. which is dispersed in the amorphous phase. The polymer softens when heated above Tg and melts at temperatures above Tm. Unfilled grades of partially crystalline polymers like PEEK are not useful in molded part forms at temperatures much above their Tg since the softening that occurs leads to a sharp loss in polymer mechanical properties, especially stiffness (i.e., modulus). This lowered stiffness is reflected in reduced dimensional stability under stress at temperatures above Tg.

Previous efforts studying the synergistic properties of PBI and polyaryletherketone (PAEK) focused on PAEK polymers with low ketone ratios; primarily PEEK with a 33% ketone ratio and PEK with a 50% ketone ratio. These mixtures do benefit from PEI's ability to immobilize the amorphous regions of the polyaryletherketone matrix resin, thereby imparting enhanced thermo-mechanical properties not obtainable with other fillers of polyaryletherketone, but which fall short of that obtained in a miscible blend of polymers. Examples of these prior efforts can be found in U.S. Pat. Nos. 4,912,176, 5,070,153, 5,391,605, and 5,844,036.

SUMMARY OF THE INVENTION

A process is demonstrated for producing a solution blend of a polybenzimidazole (PBI) and a polyetherketoneketone (PEKK), both unfilled and non-reinforced. The PBI is mixed with sulfuric acid at a temperature between 40° C. and 80° C. for 30 minutes to 2 hours to produce a PBI solution, the PBI solution is cooled to room temperature to form a cooled PBI solution. Then PEKK is added to the cooled PBI solution to form a mixture and that mixture is stirred from 30 minutes to 2 hours at room temperature to form a stirred mixture. The stirred mixture is poured into an excess of water being stirred swiftly to precipitate out the polymer blend from the mixture. The aqueous mixture is filtered to isolate the blend. The blend is washed with water and dried. The resulting blend can yield a blend in all proportion from 1/99 PBI/PEKK to 99/1 PBI/PEKK.

BRIEF DESCRIPTION OF THE DRAWINGS

The foregoing will become more readily apparent by referring to the following detailed description and the appended drawings where TGA is ThermoGravimetric Analysis in which.

DETAILED DESCRIPTION OF THE INVENTION

Figure 1:
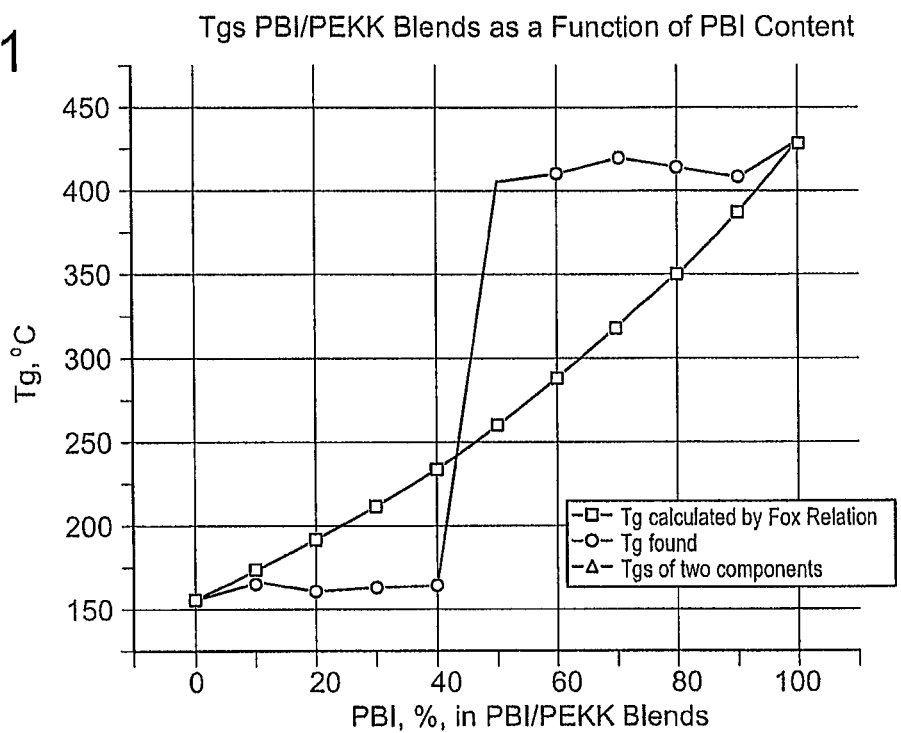
FIG. 1 is a graph plotting calculated glass transition temperatures and the actual glass transition temperatures recorded.
Figure 2:
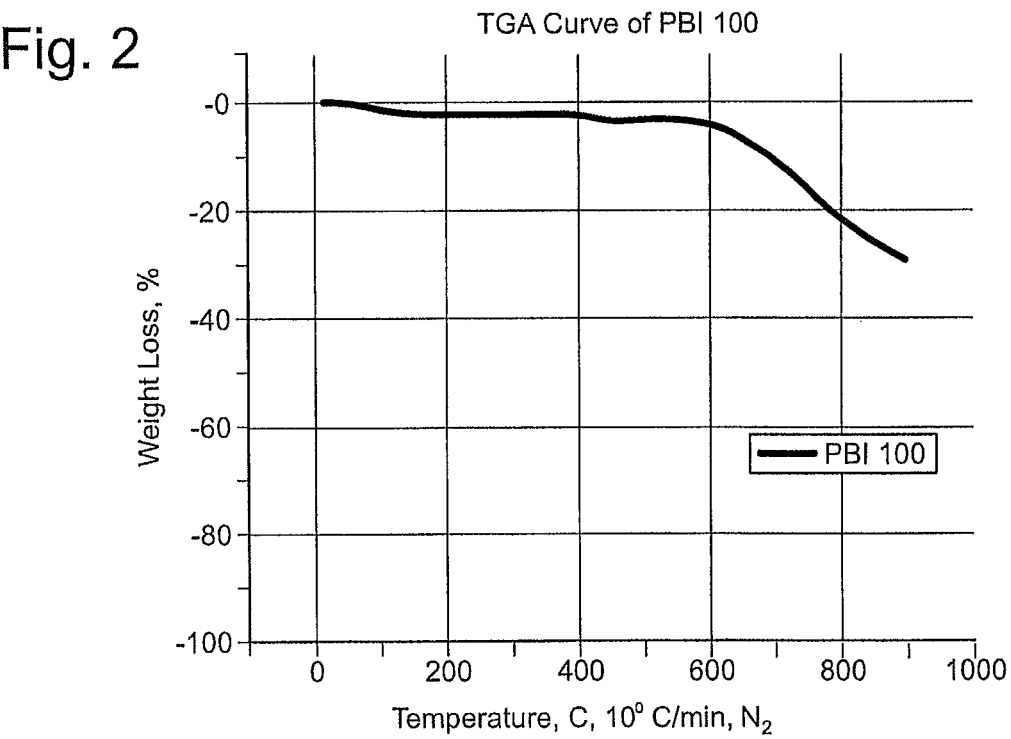
FIG. 2 is a graph plotting weight loss of PBI with temperature by TGA.
Figure 3:
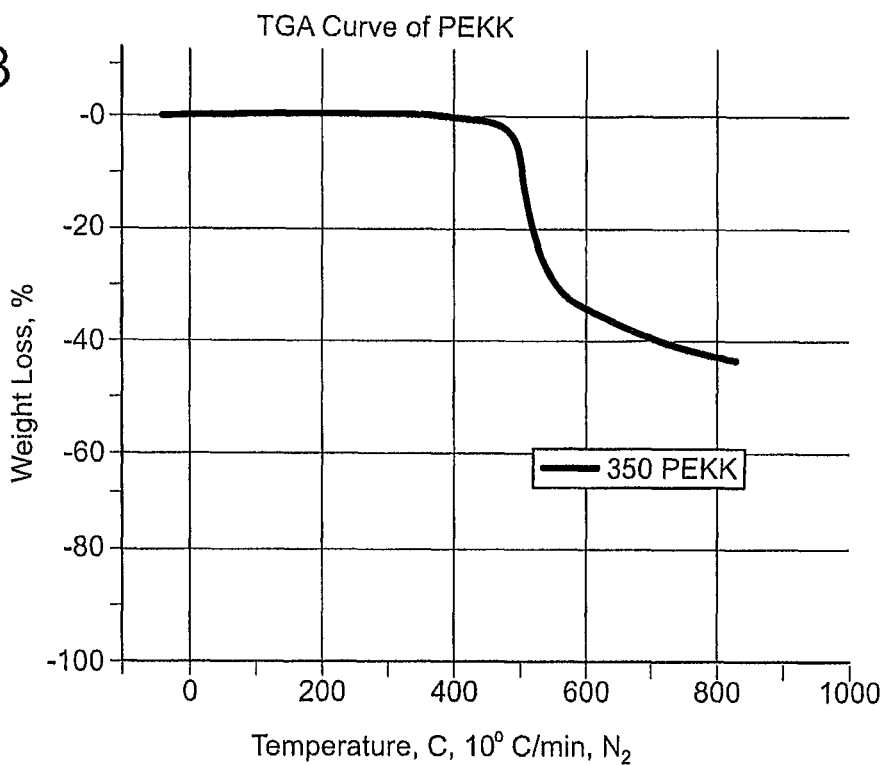
FIG. 3 is a graph plotting weight loss of PEKK with temperature by TGA.
Figure 4:
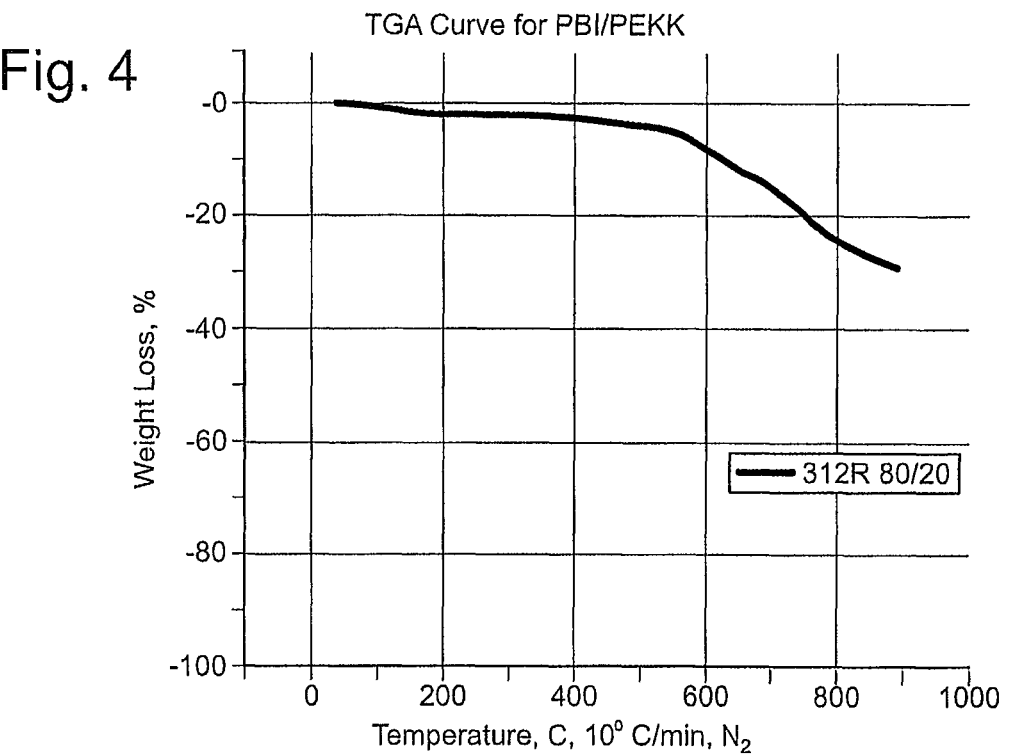
FIG. 4 is a graph plotting weight loss of a blend of 80/20 PBI/PEKK with temperature by TGA.
Figure 5:
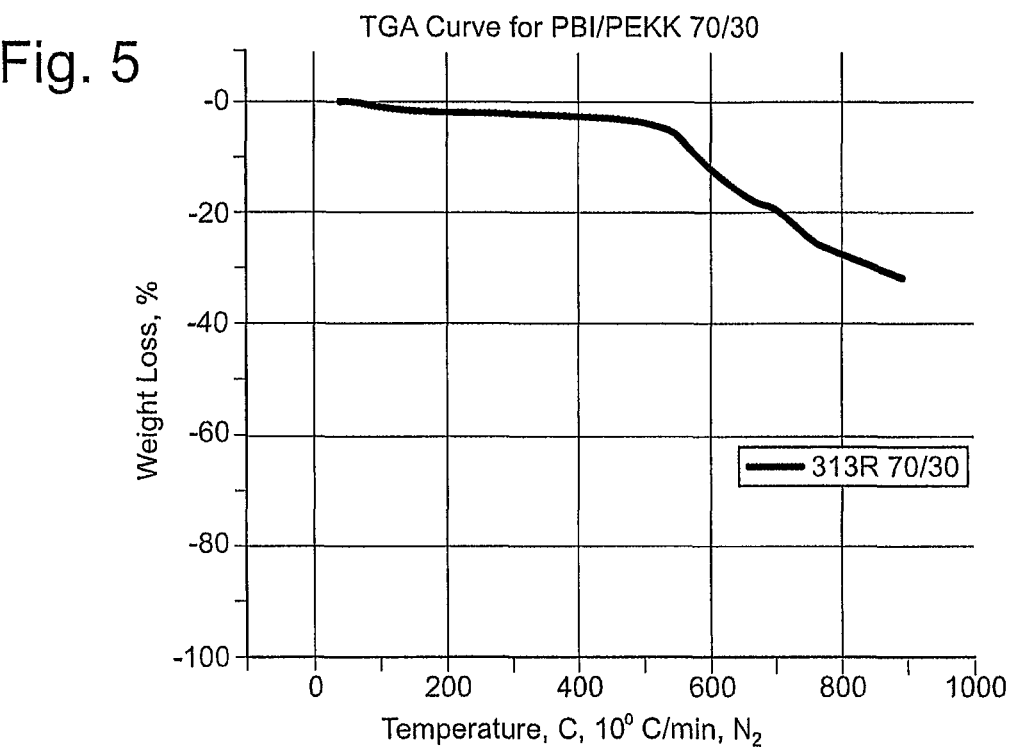
FIG. 5 is a graph plotting weight loss of a blend of 70/30 PBI/PEKK with temperature by TGA.
Figure 6:
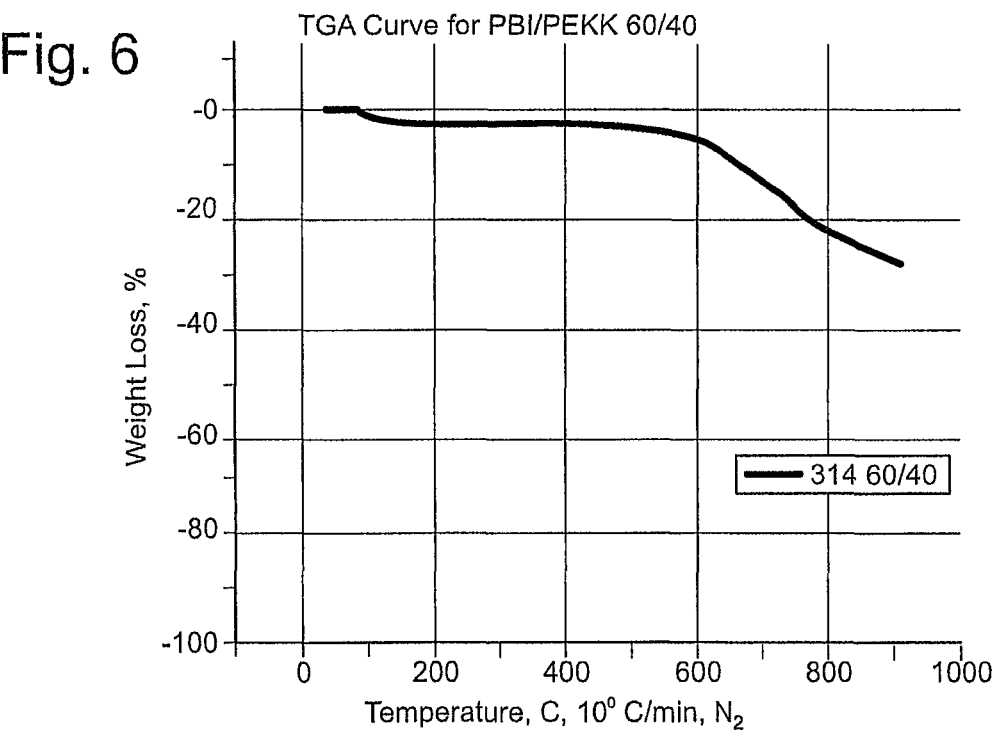
FIG. 6 is a graph plotting weight loss of a blend of 60/40 PBI/PEKK with temperature by TGA.
Figure 7:
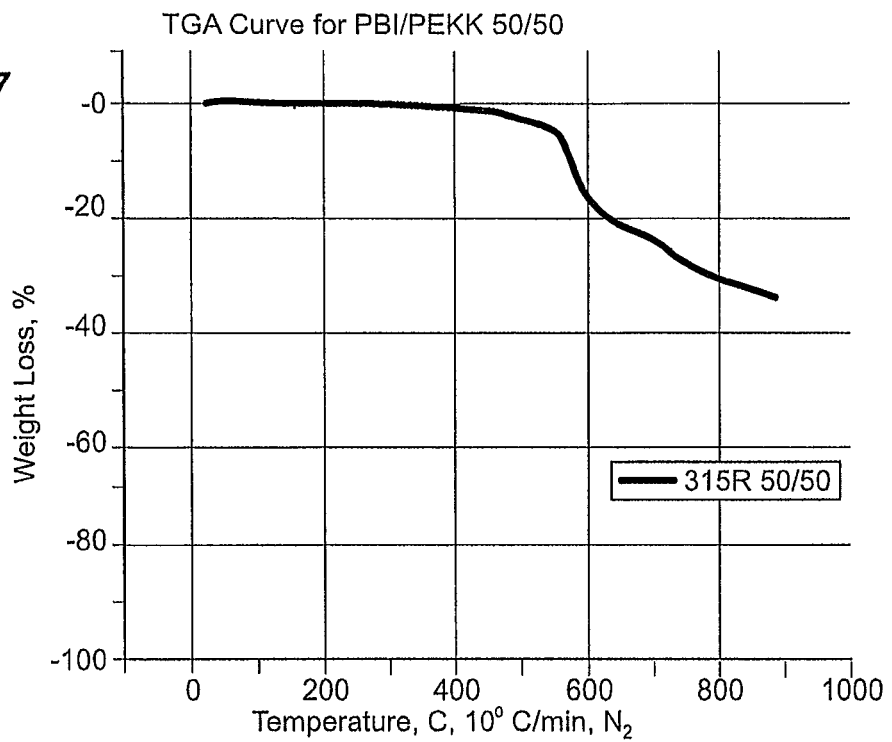
FIG. 7 is a graph plotting weight loss of a blend of 50/50 PBI/PEKK with temperature by TGA.
Figure 8:
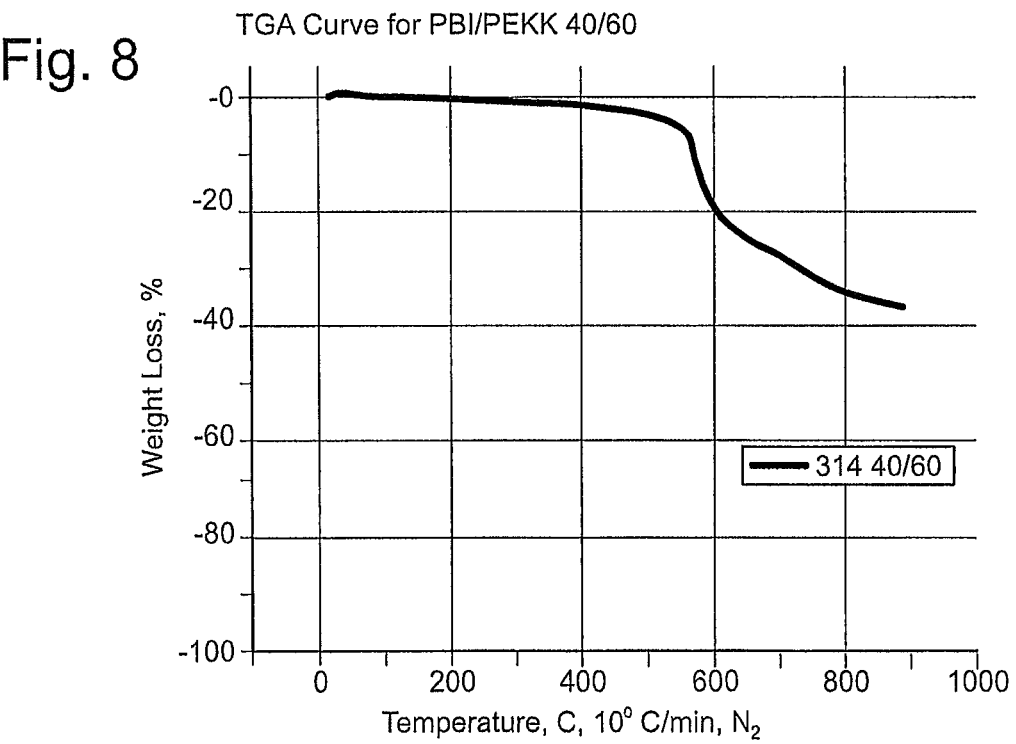
FIG. 8 is a graph plotting weight loss of a blend of 40/60 PBI/PEKK with temperature by TGA.
Figure 9:
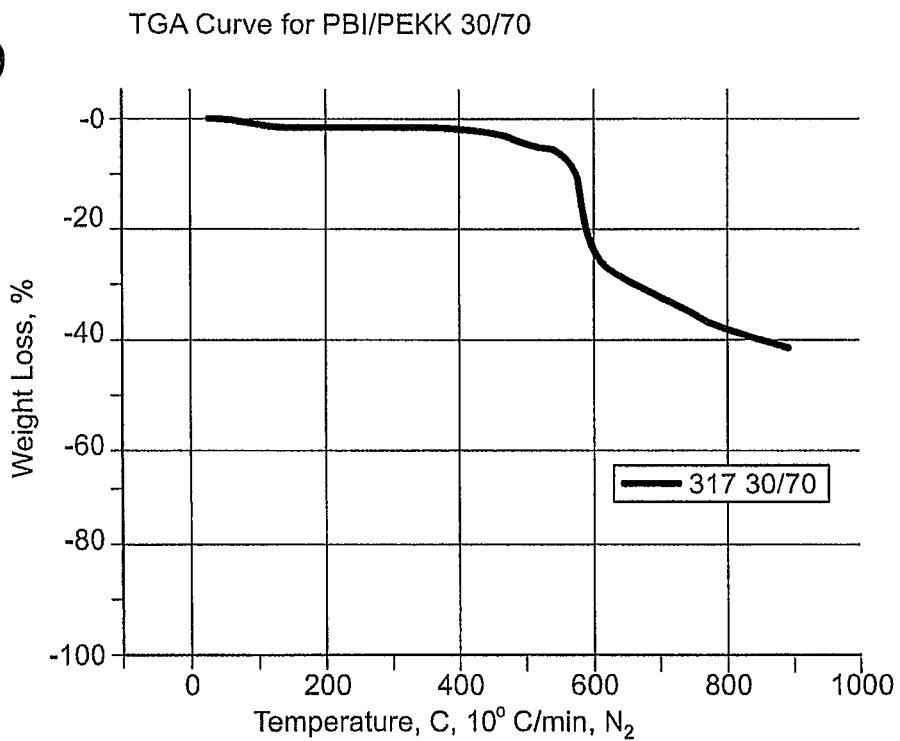
FIG. 9 is a graph plotting weight loss of a blend of 30/70 PBI/PEKK with temperature by TGA.
Figure 10:
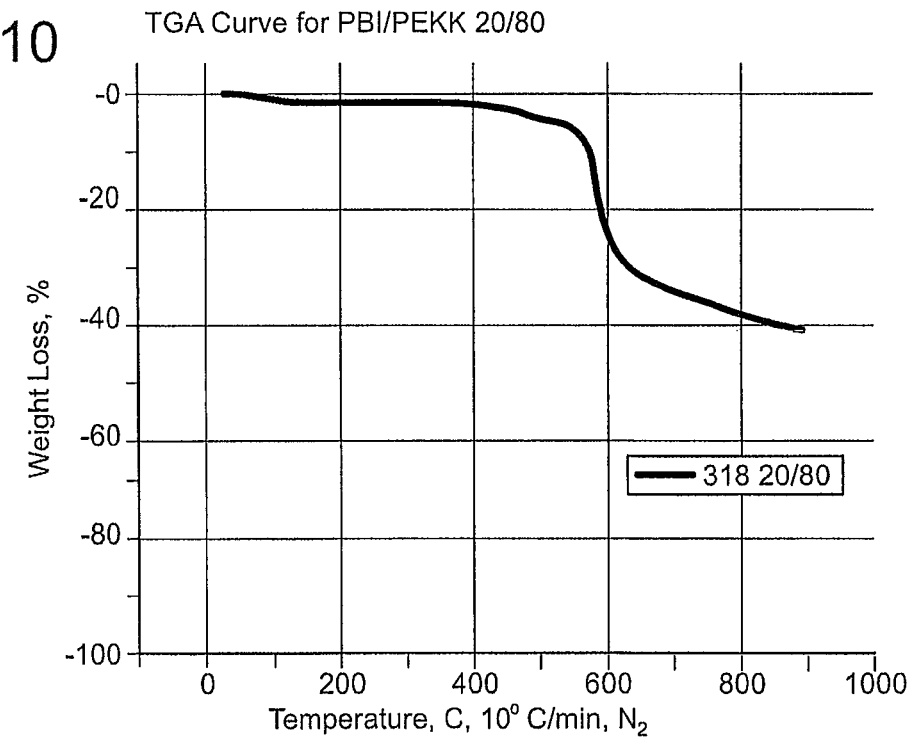
FIG. 10 is a graph plotting weight loss of a blend of 20/80 PBI/PEKK with temperature by TGA.
Figure 11:
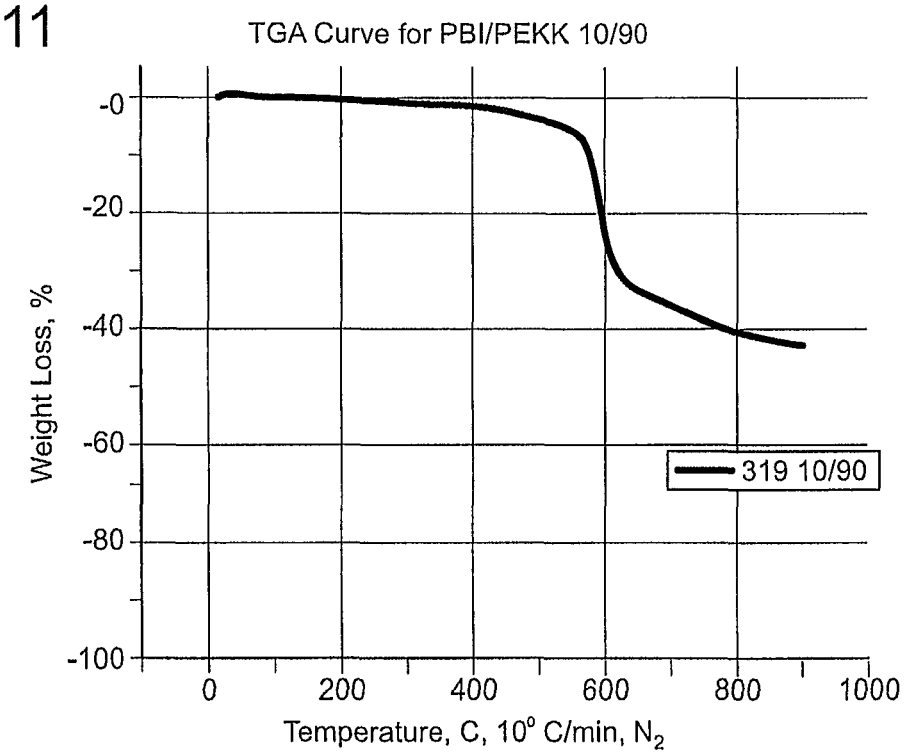
FIG. 11 is a graph plotting weight loss of a blend of 10/90 PBI/PEKK with temperature by TGA.
Figure 12:
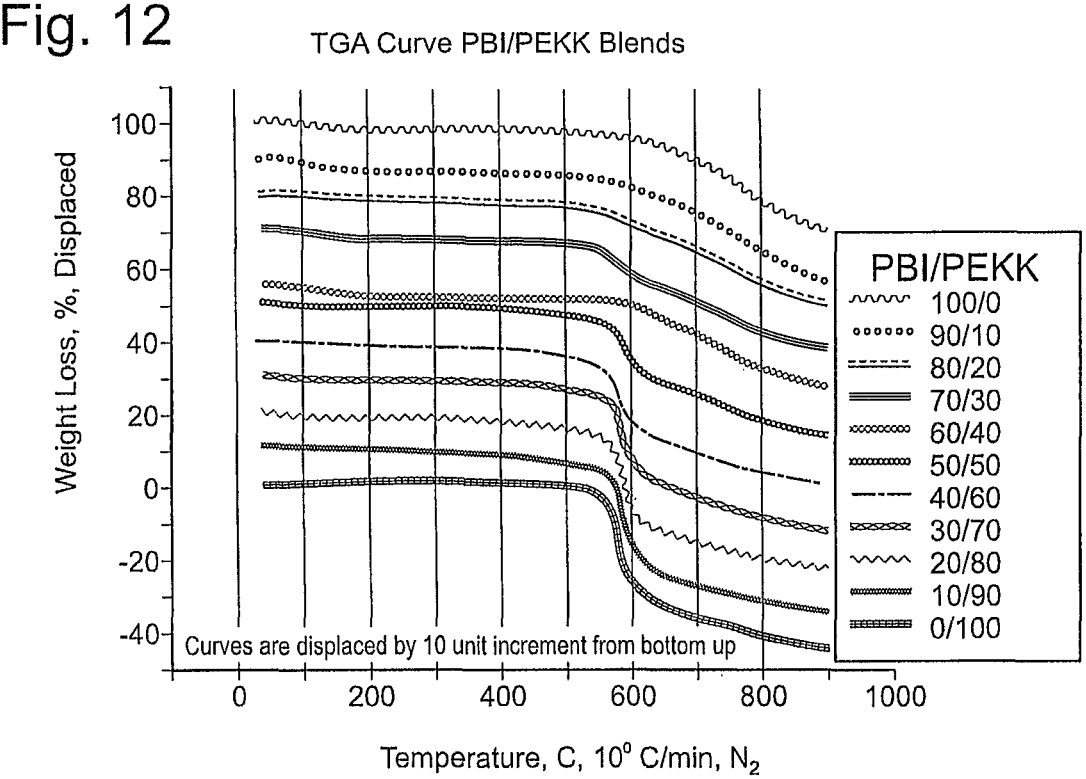
FIG. 12 is a graph plotting weight loss of all blends PBI/PEKK displaced by 10 unit increments.
Figure 13:
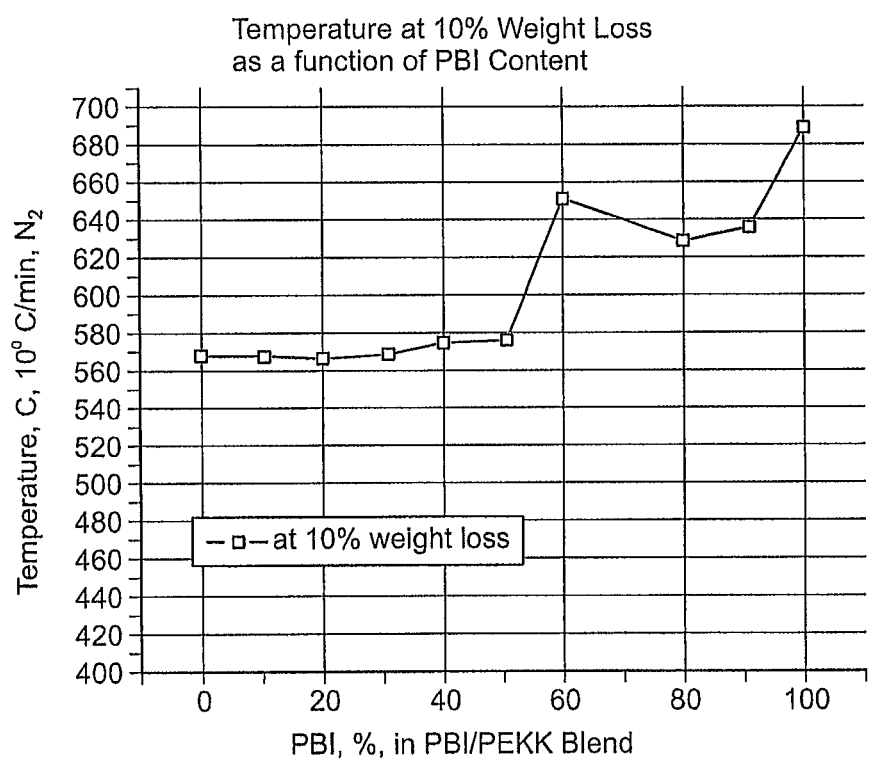
FIG. 13 is a graph plotting the temperature of 10% weight loss of blends of PBI/PEKK.

A process is demonstrated for producing a solution blend of a polybenzimidazole (PBI) and a polyetherketoneketone (PEKK). The PBI is mixed with sulfuric acid at a temperature between 40° C. and 80° C. for 30 minutes to 2 hours to produce a PBI solution then cooled to room temperature to form a cooled PBI solution. Room temperature is defined as an ambient temperature from 20° C. to 25° C. (68° to 77° F.).

Then PEKK is added to the cooled PBI solution to form a mixture and that mixture is stirred from 30 minutes to 2 hours at room temperature to form a stirred mixture. The stirred mixture is poured into an excess of water being stirred swiftly to precipitate out the polymer blend. The aqueous mixture is filtered to isolate the polymer blend. The polymer blend is washed with water and dried. The resulting blend can yield a blend in all proportion from 1/99 PBI/PEKK to 99/1 PBI/PEKK. The water used can be either tap water, deionized water, distilled water or distilled deionized water.

Once a solution of such polymers is produced the polymer blend is precipitated by dripping or spraying the mixture into a bath, where the bath is made up of water, methanol or water/methanol mixtures. The precipitated material may be ground if necessary. Subsequent drying of the blend in one embodiment can be a vacuum drying at pressures ranging from 1-200 mm Hg and at temperatures ranging from room temperature to 200° C. will produce a resin. This resin can be either injection or compression molded into articles with specifically tailored thermal and mechanical properties that lie between the respective properties of the pure substances from which they are produced.

PBI and PEKK are separately dissolved into sulfuric acid having a concentration of between 85% and 110%. It has been found that a concentration of 94% to 98% sulfuric acid works well. In one embodiment, the PBI is mixed with sulfuric acid at a temperature between 50° C. and 70° C. The process is performed at atmospheric pressure. The process is performed in the absent of added pressure. In the process, the step of being swiftly stirred can be done in an apparatus that assures good mixing. An example of such an apparatus would be a commercial or laboratory blender, such as a Waring blender. Waring blenders are available from Waring Commercial, Torrington, Conn.

The process for producing a blend of a polybenzimidazole (PBI) and a polyetherketoneketone (PEKK) may further comprise additional steps. After the blend is washed with water it can be neutralized in a base to produce a neutralized blend. This neutralized blend is washed in water to produce a washed blend. The washed blend is then dried to yield a blend in all proportion from 1/99 PBI/PEKK to 99/1 PBI/PEKK.

The base can be any base. Base is defined as a substance that can neutralize an acid. Included are both hydroxides and oxides of metal. Water soluble bases such as but not limited to potassium hydroxide, sodium hydroxide and ammonium hydroxide can be used. It has been found that ammonium hydroxide works well.

In this process the drying step may performed at a temperature from 90° C. to 210° C. The drying step is performed from 4 to 12 hours. This drying step may be performed in a vacuum. If a vacuum is used for drying, it is performed at a vacuum that ranges from 1-200 mm Hg and at temperatures ranging from ambient to 200° C. The drying process produces a resin.

This process for producing a solution blend of a polybenzimidazole (PBI) and a polyetherketoneketone (PEKK) may produce a miscible blend of a polybenzimidazole (PBI) and a polyetherketoneketone (PEKK) where the proportions are from 50/50 to 90/10 (PBI/PEKK). By miscible it is defined as a blend or composite having a predominant or single Tg, i.e., with intimate and uniform mixing. While the blends from 40/60 (PBI/PEKK) to 10/90 (PBI/PEKK) may also be miscible, they tend to behave thermally more like the PEKK. Therefore their high temperature performance is only slightly improved and as PEKK is much easier to mold and is less expensive there is far less need for these blends. The miscible blends of a polybenzimidazole (PBI) and a polyetherketoneketone (PEKK) where the proportions are from 50/50 to 90/10 (PBI/PEKK) are favored because they offer superior high temperature performance and more flexible production attributes but they are more processable than PBI by itself.

The resulting resin where the proportions are from 50/50 to 90/10 (PBI/PEKK) has a glass transition temperature, Tg, of greater than 400° C. (see FIG. 1). This resulting resin has a weight loss of less than 20% at 600° C., see FIGS. 4, 5, 6 and 7 and a weight loss of 30% or less at 800° C., see FIGS. 4, 5, 6 and 7.

One would expect that a blend of PBI resin with polyetherketoneketone would exhibit thermal properties roughly following the Fox Relationship, FIG. 1. Unexpectedly it was determined that a blend of a polybenzimidazole (PBI) and a polyetherketoneketone (PEKK) in all proportions from 50/50 to 90/10 (PBI/PEKK) made by the solution process has a glass transition temperature Tg of greater than 400° C. This is a thermal property, which is greater than that predicted by the Fox Relationship.

The Fox equation defines or describes the composition dependence of the Tg of ideal copolymer or ideal polymer blends (or miscible blend of two polymers) in which no strong interactions are involved. The Fox equation typically is expected to lead to a lower value of Tg than would be given by a simple linear Rule of Mixtures and reflects the effective higher free volume or randomness due to the presence of two components in a mixture:

$1/Tg=m1/Tg1+m2/Tg2$ where m is the respective mass fraction or $1/Tg=w/Tg1+(1-w)/Tg2$ where w is the weight fraction In one of the embodiments of the invention, a process is shown for producing a solution blend of a polybenzimidazole (PBI) and a polyetherketoneketone (PEKK). The PBI and PEKK is mixed with a strong acid at a temperature between 40° C. and 80° C. for 30 minutes to 2 hours to produce a mixture which then is cooled to room temperature. The strong acid is selected from a group of acids consisting of: sulfuric acid, methane sulfonic acid, trifluoromethane sulfonic acid, trifluoroacetic acid, dichloroacetic acid, formic acid and combinations thereof. Room temperature is defined as an ambient temperature from 20° C. to 25° C. (68° to 77° F.). The mixture is dropped into a bath of a non-solvent. The bath is selected from the group of water, methanol and water/methanol blends. The bath is being stirred swiftly to precipitate out the polymer blend. This mixture is then filtered to isolate the polymer blend. The polymer blend is washed with water and dried. The resulting blend can yield a blend in all proportion from 1/99 PBI/PEKK to 99/1 PBI/PEKK. The water used can be either tap water or deionized water.

In this embodiment the PBI and PEKK are dissolved together into the strong acid having a concentration of between 80% and 120%. It has been found that a concentration of 94% to 98% acid works well. Sulfuric acid has been found to work well. In one embodiment, the PBI is mixed with PEKK in a strong acid at a temperature between 50° C. and 70° C. The process is performed at atmospheric pressure. The process is performed in the absent of added pressure.

In this embodiment it should be recognized that mixing together can be at the same time or it can be stepwise. If it is stepwise then one or the other polymer is added and dissolved or partially dissolved before the other polymer is added. It may be that only one of the polymers needs to be added at an elevated temperature where the other polymer can be added at room temperature.

In this embodiment the process for producing a blend of a polybenzimidazole (PBI) and a polyetherketoneketone (PEKK) may further comprise additional steps. After the blend is washed with water it can be neutralized in a base to produce a neutralized blend. This neutralized blend is washed in water to produce a washed blend. The washed blend is then dried to yield a blend in all proportion from 1/99 PBI/PEKK to 99/1 PBI/PEKK. The base can be any base. Water soluble bases such as but not limited to potassium hydroxide, sodium hydroxide and ammonium hydroxide can be used. It has been found that ammonium hydroxide works well.

In this embodiment a solution of such polymers is produced and the polymer blend is precipitated by dripping or spraying the mixture into water or water/methanol mixtures. The precipitated material may be ground if necessary. Subsequent drying of the blend in one embodiment can be a vacuum drying at pressures ranging from 1-200 mm Hg and at temperatures ranging from room temperature to 200° C. to produce a resin. This resin can be either injection or compression molded into articles with specifically tailored thermal and mechanical properties that lie between the respective properties of the pure substances from which they are produced. These blends can be used to enhance films, composites or alloys. Further, these blends can be reinforced or filled prior to molding.

A process for producing a melt blend of a polybenzimidazole (PBI) and a polyetherketoneketone (PEKK) is also provided. In this alternate process a polybenzimidazole (PBI) and a polyetherketoneketone (PEKK) are pre-mixed dry to obtain a dry mix. In an extruder with a plurality of heating zones the dry mix is feed. The heating zones of the extruder are set in the range 240° C. to 410° C. The dry mix is melted as it passes through the extruder and is subjected to the mixing and the temperatures generated by the extruder. The resulting product is a melt blend of PBI/PEKK in all proportion from 1/99 PBI/PEKK to 80/20 PBI/PEKK.

The extruder can be either a single screw or twin-screw extruder. When extruding this type of material where the viscosity of the material tends to be high, the screw or screws are usually run in a range of 20 rpm to 200 rpm. In one embodiment the extruder is a screw extruder and is run in a range of 30 to 160 rpm. In another embodiment the extruder screw is run in a range 40 rpm to 120 rpm. An example of such an extruder is a Brabender extruder. C. W. Brabender of South Hackensack, N.J. offers the same product line as the Brabender® GmbH & Co. KG for the North American market.

The extruder will have at least two heating zones, but in some cases it can have three or more heating zones. In one embodiment those heating zones will be set to a range of 240° C. to 400° C. In another embodiment those heating zones will be set to a range of 250° C. to 395° C. In most cases the first heating zone will be set a lower temperature than the subsequent heating zones. This can be seen more clearly by referring to Table D in the Examples section.

A miscible blend of a polybenzimidazole (PBI) and a polyetherketoneketone (PEKK) can be made by this process, where the blend has from 60/40 to 80/20 (PBI/PEKK) where the blend has a weight loss of less than 20% at 600° C. a weight loss of 30% or less at 800° C.

One would expect that a blend of PBI resin with polyetherketoneketone would exhibit thermal properties roughly following the Rule of Mixtures. Unexpectedly it was determined that a blend of a polybenzimidazole (PBI) and a polyetherketoneketone (PEKK) in all proportions from 60/40 to 80/20 (PBI/PEKK) made by the melt blend process has a glass transition temperature, Tg, of greater than 400° C. This is a thermal property, which is greater than that predicted by the Fox Relationship.

EXAMPLES

Various batches of blends of PBI/PEKK were prepared and tested along with a batch of a commercially available PBI, CELAZOLE® PBI 100 mesh, available from PBI Performance Products Inc., Charlotte N.C. (sample 300). The PEKK used was an amorphous PEKK, an example of which is A1050G. PEKK is available from Infinite Polymer Systems, State College, Pa. or Oxford Performance Materials, New Britain, Conn.; Cytec, W. Patterson, N.J. The blends were prepared as outlined below.

The samples were tested and the results can be seen in Table A. TGA is ThermoGravimetric Analysis. The weight loss of a substance heated or cooled at a controlled rate, which is recorded as a function of time and temperature. Frequently the rate of weight change is also measured electronically by taking the first derivative of the weight change with time. The Differential Scanning calorimetry experiments were conducted in a TA Instruments DSC 2020 Modulated DSC. The samples were continuously flushed with nitrogen. Glass transition temperatures were measured for both the first and second scanning with a heating rate of 10° C./min. The rate of cooling the sample between the two heating was 10° C./min.

Preparation of PBI Di-Blends with PEKK

Experiment 311

Preparation of PBI/PEKK 90/10 in Solution

In a 500 ml three-necked resin-flask equipped with a mechanical glass stirrer with four blades and nitrogen inlet and outlet were added 18 grams of PBI 100 and 180 grams of 96% sulfuric acid. The mixture was stirred for one hour at 60° C. to dissolve the PBI, and was cooled to room temperature. To the cooled PBI solution was added 2 grams of PEKK. The resulting mixture was stirred for one hour at room temperature, poured into one liter of fast stirring water in a Waring blender, filtered to collect the polymer blend. The blend was washed with water, neutralized with ammonium hydroxide, filtered, washed again with water, and then dried for overnight under vacuum at 120° C. to obtain 20 grams of PBI/PEKK 90/10 blend with the following thermal properties; Single Tg of 409° C. from the second DSC scanning; Td onset 612° C., Td at 10% weight loss 636° C. at 10° C./minute under nitrogen. (Td=decomposition temperature)

Experiment 312

Preparation of PBI/PEKK 80/20 in solution

In a 500 ml three-necked resin-flask equipped with a mechanical glass stirrer with four blades and nitrogen inlet and outlet were added 16 grams of PBI 100 and 180 grams of 96% sulfuric acid. The mixture was stirred for one hour at 60° C. to dissolve the PBI, and was cooled to room temperature. To the cooled PBI solution was added 4 grams of PERK. The resulting mixture was stirred for one hour at room temperature, poured into one liter of fast stirring water in a Waring blender, filtered to collect the polymer blend. The blend was washed with water, neutralized with ammonium hydroxide, filtered, washed again with water, and then dried for overnight under vacuum at 120° C. to obtain 14.6 grams of PBI/PEKK 80/20 blend with the following thermal properties; Single Tg of 414° C. from the second DSC scanning; Td onset 559° C., Td at 10% weight loss 630° C. at 10° C./minute under nitrogen. (Td=decomposition temperature)

Experiment 313

Preparation of PBI/PEKK 70/30 in Solution

In a 500 ml three-necked resin-flask equipped with a mechanical glass stirrer with four blades and nitrogen inlet and outlet were added 14 grams of PBI 100 and 180 grams of 96% sulfuric acid. The mixture was stirred for one hour at 60° C. to dissolve the PBI, and was cooled to room temperature. To the cooled PBI solution was added 6 grams of PEKK. The resulting mixture was stirred for one hour at room temperature, poured into one liter of fast stirring water in a Waring blender, filtered to collect the polymer blend. The blend was washed with water, neutralized with ammonium hydroxide, filtered, washed again with water, and then dried for overnight under vacuum at 120° C. to obtain 19.6 grams of PBI/PEKK 70/30 blend with the following thermal properties; Tgs of 157 and 418° C. from the second DSC scanning (however it is believed that the Tg of 157 may be an anomaly); Td onset 529° C., Td at 10% weight loss 580° C. at 10° C./minute under nitrogen. (Td=decomposition temperature)

Experiment 314
Preparation of PBI/PEKK 60/40 in Solution

In a 500 ml three-necked resin-flask equipped with a mechanical glass stirrer with four blades and nitrogen inlet and outlet were added 12 grains of PBI 100 and 180 grams of 96% sulfuric acid. The mixture was stirred for one hour at 60° C. to dissolve the PBI, and was cooled to room temperature. To the cooled PBI solution was added 8 grams of PEKK. The resulting mixture was stirred for one hour at room temperature, poured into one liter of fast stirring water in a Waring blender, filtered to collect the polymer blend. The blend was washed with water, neutralized with ammonium hydroxide, filtered, washed again with water, and then dried for overnight under vacuum at 120° C. to obtain 11.3 grams of PBI/PEKK 60/40 blend with the following thermal properties; Single Tg of 410° C. from the second DSC scanning; Td onset 582° C., Td at 10% weight loss 652° C. at 10° C./minute under nitrogen. (Td=decomposition temperature)

Experiment 315
Preparation of PBI/PEKK 50/50 in Solution

In a 500 ml three-necked resin-flask equipped with a mechanical glass stirrer with four blades and nitrogen inlet and outlet were added 10 grams of PBI 100 and 180 grams of 96% sulfuric acid. The mixture was stirred for one hour at 60° C. to dissolve the PBI, and was cooled to room temperature. To the cooled PBI solution was added 10 grams of PEKK. The resulting mixture was stirred for one hour at room temperature, poured into one liter of fast stirring water in a Waring blender, filtered to collect the polymer blend. The blend was washed with water, neutralized with ammonium hydroxide, filtered, washed again with water, and then dried for overnight under vacuum at 120° C. to obtain 19.9 grams of PBI/PEKK 50/50 blend with the following thermal properties; Tgs of 162, 219 (very weak intermediate Tg), and 405° C. from the second DSC scanning; Td onset 559° C., Td at 10% weight loss 557° C. at 10° C./minute under nitrogen. (Td=decomposition temperature)

Experiment 316
Preparation of PBI/PEKK 40/60 in Solution

In a 500 ml three-necked resin-flask equipped with a mechanical glass stirrer with four blades and nitrogen inlet and outlet were added 8 grams of PBI 100 and 180 grams of 96% sulfuric acid. The mixture was stirred for one hour at 60° C. to dissolve the PBI, and was cooled to room temperature. To the cooled PBI solution was added 12 grams of PEKK. The resulting mixture was stirred for one hour at room temperature, poured into one liter of fast stirring water in a Waring blender, filtered to collect the polymer blend. The blend was washed with water, neutralized with ammonium hydroxide, filtered, washed again with water, and then dried for overnight under vacuum at 120° C. to obtain 19.7 grams of PBI/PEKK 40/60 blend with the following thermal properties: Single Tg of 165° C. from the second DSC scanning; Td onset 550° C., Td at 10% weight loss 576° C. at 10° C./minute under nitrogen. (Td=decomposition temperature)

Experiment 317
Preparation of PBI/PEKK 30/70 in Solution

In a 500 ml three-necked resin-flask equipped with a mechanical glass stirrer with four blades and nitrogen inlet and outlet were added 6 grams of PBI 100 and 180 grains of 96% sulfuric acid. The mixture was stirred for one hour at 60° C. to dissolve the PBI, and was cooled to room temperature. To the cooled PBI solution was added 14 grams of PEKK. The resulting mixture was stirred for one hour at room temperature, poured into one liter of fast stirring water in a Waring blender, filtered to collect the polymer blend. The blend was washed with water, neutralized with ammonium hydroxide, filtered, washed again with water, and then dried for overnight under vacuum at 120° C. to obtain 19.3 grams of PBI/PEKK 30/70 blend with woody structure and the following thermal properties; Single Tg of 163° C. from the second DSC scanning; Td onset 559° C., Td at 10% weight loss 570° C. at 10° C./minute under nitrogen. (Td=decomposition temperature)

Experiment 318
Preparation of PBI/PEKK 20/80 in Solution

In a 500 ml three-necked resin-flask equipped with a mechanical glass stirrer with four blades and nitrogen inlet and outlet were added 4 grams of PBI 100 and 180 grams of 96% sulfuric acid. The mixture was stirred for one hour at 60° C. to dissolve the PBI, and was cooled to room temperature. To the cooled PBI solution was added 16 grams of PEKK. The resulting mixture was stirred for one hour at room temperature, poured into one liter of fast stirring water in a Waring blender, filtered to collect the polymer blend. The blend was washed with water, neutralized with ammonium hydroxide, filtered, washed again with water, and then dried for overnight under vacuum at 120° C. to obtain 19.3 grams of PBI/PEKK 20/80 blend with woody structure and the following thermal properties; Single Tg of 159.5° C. from the second DSC scanning; Td onset 559° C., Td at 10% weight loss 568° C. at 10° C./minute under nitrogen. (Td=decomposition temperature)

Experiment 319
Preparation of PBI/PEKK 10/90 in Solution

In a 500 ml three-necked resin-flask equipped with a mechanical glass stirrer with four blades and nitrogen inlet and outlet were added 2 grams of PBI 100 and 180 grams of 96% sulfuric acid. The mixture was stirred for one hour at 60° C. to dissolve the PBI, and was cooled to room temperature. To the cooled PBI solution was added 18 grams of PEKK. The resulting mixture was stirred for one hour at room temperature, poured into one liter of fast stirring water in a Waring blender, filtered to collect the polymer blend. The blend was washed with water, neutralized with ammonium hydroxide, filtered, washed again with water, and then dried for overnight under vacuum at 120° C. to obtain 20.9 grams of PBI/PEKK 10/90 blend with woody fibrous structure and the following thermal properties; Single Tg of 163.5° C. from the second DSC scanning; Td onset 559° C., Td at 10% weight loss 568° C. at 10° C./minute under nitrogen. (Td=decomposition temperature)

The results of these experiments can be viewed more clearly by referring to the tables below.

TABLE A

Tgs of PBI/PEKK Blends

| Batch ID | PBI/PEKK | Tg1 | Tg2 |
| --- | --- | --- | --- |
| 300 (PBI 100) | | | 434 |
| 311 | 90/10 | ND | 409 |
| 312 | 80/20 | ND | 414 |
| 313 | 70/30 | 157** | 418 |
| 314 | 60/40 | ND | 410 |
| 315 | 50/50 | 162 | 406 |
| 316 | 40/60 | 165 | ND |

TABLE A-continued

Tgs of PBI/PEKK Blends

| Batch ID | PBI/PEKK | Tg1 | Tg2 |
|---|---|---|---|
| 317R | 30/70 | 163 | ND |
| 318 | 20/80 | 159.5 | ND |
| 319 | 10/90 | 163.5 | ND |
| 350 PEKK | 0/100 | 155.5 | ND |

**Possible anomalous Tg1 temperature
ND = Not detected

The glass transition temperatures for the blend samples and for the unblended samples of PBI and PEKK were recorded, as was the expected glass transition temperatures for the blends calculated in accordance to the Fox Relationship as shown in Table B and in FIG. 1. Note that in Table B the glass transition temperatures (Tg) are given in both degrees centigrade and degrees Kelvin.

TABLE B

| Tg | PBI % | PEKK % | Calc Tg K | Calc Tg C | Tg Found | Tg Found |
|---|---|---|---|---|---|---|
| 300 | 100 | 0 | 707 | 434 | 434 | |
| 311 | 90 | 10 | 663.8534 | 390.8534 | 409 | |
| 312 | 80 | 20 | 625.6702 | 352.6702 | 414 | |
| 313 | 70 | 30 | 591.6405 | 318.6405 | 418 | 157 |
| 314 | 60 | 40 | 561.1215 | 288.1215 | 410 | |
| 315 | 50 | 50 | 533.5967 | 260.5967 | 405 | 162 |
| 316 | 40 | 60 | 508.6459 | 235.6459 | 165 | 165 |
| 317 | 30 | 70 | 485.9243 | 212.9243 | 163 | 163 |
| 318 | 20 | 80 | 465.1459 | 192.1459 | 159.5 | 159.5 |
| 319 | 10 | 90 | 446.0716 | 173.0716 | 163.5 | 163.5 |
| 350 | 0 | 100 | 428.5 | 155.5 | 155.5 | 155.5 |

Weight loss curves were obtained on a TGA/SDTA 857e Mettler Toledo with a heating rate of 10° C./min. under nitrogen. The results are shown in FIGS. 2-13 and in Table C.

TABLE C

Temperature (° C.) at 10% weight loss for PBI/PEKK

| Sample ID | PBI/PEKK | TGA on set | Td10 |
|---|---|---|---|
| 300 | 100/0 | 641 | 691 |
| 311 | 90/10 | 612 | 636 |
| 312 | 80/20 | 559 | 630 |
| 313 | 70/30 | 529 | 580 |
| 314 | 60/40 | 582 | 652 |
| 315 | 50/50 | 559 | 577 |
| 316 | 40/60 | 550 | 576 |
| 317 | 30/70 | 559 | 570 |
| 318 | 20/80 | 559 | 568 |
| 319 | 10/90 | 559 | 568 |
| 350 | 0/100 | 553 | 569 |

Melt-extrusion of PBI/PEKK di-blends with various compositions as indicated below were pre-dry-mixed and fed through a Brabender extruder with a ¾ inch diameter barrel (1.91 cm) 18 inches long (45.72 cm) with three heating zones at 50-100 rpm. The 100 grams of blends were extruded through a tube die under the heating conditions specified in the tables to produce tubes. Batch 612 was a 80/20 blend of PBI/PEKK, batch 613 was a 70/30 blend of PBI/PEKK, and sample 614 was a 60/40 blend of PBI/PEKK as shown in Table D. All extruded well except sample #612 PBI/PEKK 80/20 di-blend that also extruded but with some difficulty.

TABLE D

Melt-extrusion of PBI/PEKK Di-Blends

| Batch ID | PBI/PEKK | $1^{st}$ zone Temp. ° C. | $2^{nd}$ zone Temp. ° C. | $3^{rd}$ zone Temp. ° C. |
|---|---|---|---|---|
| 612 | 80/20 | 260 | 360 | 390 |
| 613 | 70/30 | 260 | 350 | 380 |
| 614 | 60/40 | 260 | 340 | 360 |

What is claimed is:

1. A process for producing a melt blend of a polybenzimidazole (PBI) and a polyetherketoneketone (PEKK) which comprises the steps of:
   pre-dry-mixing a PBI with a PEKK to obtain a dry mix;
   feeding said dry mix to an extruder with a plurality of heating zones;
   setting said heating zones in the range 240° C. to 400° C.;
   melting said dry mix blend as it passes through said extruder; and
   obtaining said melt blend of PBI/PEKK in all proportion within a range from 1/99 PBI/PEKK to 80/20 PBI/PEKK.

2. The process for producing a melt blend of a polybenzimidazole (PBI) and a polyetherketoneketone (PEKK) according to claim 1 where said extruder is a screw extruder and said screw is run in a range of 30 to 160 rpm.

* * * * *